Patented Oct. 9, 1951

2,570,793

UNITED STATES PATENT OFFICE 2,570,793

PREPARATION OF ACYL FLUORIDES

William F. Gresham and Irving D. Webb, Wilmington, Del., assignors to E. I. du Pont de Nemours & Company, Wilmington, Del., a corporation of Delaware No Drawing. Application March 11, 1948,
Serial No. 14,383

8 Claims. (Cl. 260—544)

This invention relates to the synthesis of acyl fluorides by reaction between carbon monoxide, hydrogen fluoride, and secondary organic chlorides and/or bromides. It relates also to beta-chloroisobutyryl fluoride, and to a novel process for preparing the same.

Heretofore acyl fluorides have been prepared by reaction between acyl chlorides and certain inorganic fluorides. It has also been reported that mixed carbonylation products can be obtained by reaction between alkyl chlorides and carbon monoxide in the presence of anhydrous aluminum chloride.

An object of this invention is to provide improvements in methods for the synthesis of acyl fluorides. Another object is to prepare reaction products from secondary organic chlorides or bromides, carbon monoxide and hydrogen fluoride. A further object is to provide a process for the manufacture of beta-chloroisobutyryl fluoride. Other objects of the invention will appear hereinafter.

It has been discovered in accordance with this invention that secondary organic chlorides or bromides react with carbon monoxide and hydrogen fluoride simultaneously, in the presence of boron trifluoride, preferably at a temperature within the range of —5° to +40° C., at elevated pressures, to form acyl fluorides. The formation of an acyl fluoride in accordance with a specific embodiment of the invention may be represented as follows:

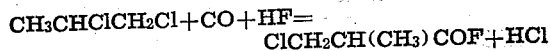

$$CH_3CHClCH_2Cl + CO + HF = ClCH_2CH(CH_3)COF + HCl$$

It is noteworthy that primary halogens fail to react with carbon monoxide and HF, under the reaction conditions.

In general the quantity of boron trifluoride catalyst which is employed in the practice of the invention may be varied rather widely but best results are obtained when the quantity of boron trifluoride is about 1 mole, or more, per mole of the secondary halide employed. Generally it is desirable that the reaction mixture remain substantially anhydrous throughout the course of the reaction, since relatively small amounts of water tend to diminish the activity of the boron trifluoride catalyst in the said reaction between the secondary halide, carbon monoxide and hydrogen fluoride.

Hydrogen fluoride is an essential ingredient of the reaction mixture, since, in the absence of hydrogen fluoride, secondary organic chlorides, in general, fail to react with carbon monoxide, even though boron fluoride is present. In this respect the secondary halides differ from the tertiary halides, carbonylation of which, in the presence of a boron fluoride catalyst, is disclosed in the copending application S. N. 14,384, which was filed March 11, 1948.

The process of the invention may be carried out at any convenient superatmospheric pressure, excellent results being obtained at pressures in excess of 10 atmospheres. Optimum pressures from the standpoint of high yields and rapid rates of reaction, are within the range of about 65 to 700 atmospheres, or higher.

Preferably, the temperature at which the secondary halide reacts with carbon monoxide and hydrogen fluoride to form acyl fluoride should be carefully controlled, because at temperatures in excess of about 40° C., the yield of acyl fluoride is extremely poor. Within a relatively narrow range of temperatures, namely about 0° to 20° C., very high yields are obtained in the practice of the invention, especially at pressures within the range of 10 to 1,000 atmospheres.

Any suitable secondary organic chloride or bromide may be employed in the practice of this invention. By secondary organic halide is meant an organic halide having a halogen atom attached to a secondary carbon atom. The said halogen is referred to herein as a secondary halogen.

The invention is illustrated further by means of the following examples.

*Example 1.*—A stainless steel shaker tube was cooled to —50° C. and charged with 20 grams of hydrogen fluoride (1 mole), 68 grams of boron trifluoride (1 mole) and 46 grams of dry 1,2-dichloropropane (0.5 mole). Carbon monoxide was injected into the resulting mixture until the total pressure reached 600 atmospheres. Shaking was started at an initial reaction temperature of —28° C., and was continued over a period of 130 minutes during which time the temperature rose to +18° C. While the reaction was in progress the total pressure of the reaction mixture was maintained at about 600 atmospheres by intermittent injection of carbon monoxide. At the end of this reaction period the tube was cooled to 0° C. and discharged. The resulting product contained beta-chloroisobutyryl fluoride, B. P. 37° to 38° C. at 25 mm. Hg. This was identified by reaction with methanol, which gave methyl beta-chloroisobutyrate (B. P., 153° to 155° C.). The conversion of 1,2-dichloropropane to beta-chloroisobutyryl fluoride was about 53%, and the yield, based upon the weight of 1,2-dichloropropane reacting, was about 88% of the maximum theoretical yield.

*Example 2.*—The experiment described in Example 1 was repeated in a series of experiments in which the reaction temperature was varied as set forth in the following table. The table shows the effect of variations in reaction temperature upon the rate of conversion of 1,2-dichloropropane to beta-chloroisobutyryl fluoride.

TABLE 1

*Reaction of 1,2-dichloropropane with carbon monoxide and hydrogen fluoride at various temperatures*

| Experiment No. | Maximum Temperature of Reaction | Conversion (Per Cent) to Acyl Fluoride |
|---|---|---|
| | °C. | |
| 1 | −30 | 0 (15 min.) |
| 2 | −14 | 0 (22 min.) |
| 3 | 0 | 8 (20 min.) |
| 4 | +6 | 15 (46 min.) |
| 5 | +16 | 14 (65 min.) |
| 6 | +35 | 9 (25 min.) |
| 7 | +35 | 8 (25 min.) |
| 8 | +100 | 0 (60 min.) |
| 9 | +200 | 0 (60 min.) |

*Example 3.*—In a series of experiments 1,2-dichloropropane was reacted with carbon monoxide and hydrogen fluoride under the conditions set forth in the following table. The table illustrates the effects of catalysts, etc., upon the conversion of 1,2-dichloropropane to beta-chloroisobutyryl fluoride, and shows that the beta-chloroisobutyryl fluoride is obtainable in very high yields under the preferred reaction conditions set forth.

TABLE 2

*Reaction of 1,2-dichloropropane with carbon monoxide and hydrogen fluoride-effect of catalysts*

| Moles 1,2-Dichloropropane | HF | BF₃ | Other Catalyst | Max. Temp. | Pressure Atmospheres | Time (hr.) | Product Formed | Conv., Per Cent | Yield, Per Cent | Comments |
|---|---|---|---|---|---|---|---|---|---|---|
| | | | | C. | | | | | | |
| 0.5 | 0.5 | 0.5 | | 15 | 65 | 1 | Acyl fluoride | 25 | 65 | |
| 1 | 1 | 1 | | 20 | 600 | 2 | do | 5 | 80 | LiF inhibits. |
| 0.5 | 1 | 1 | LiF | 18 | 600 | 2 | do | 53 | 88 | Excess catalyst beneficial. |
| 1 | 0.25 | 0.25 | | 15 | 600 | 1 | do | 7 | 89 | |
| 0.5 | 0.5 | 1 | | 15 | 600 | 1 | do | 35 | 85 | |
| 0.4 | 1.3 | 1.3 | | 15 | 700 | 1.5 | do | 55 | | |
| 0.4 | | 1 | | 15 | 700 | 1.5 | None | 0 | | |
| 0.4 | 1 | | | 12 | 65 | 2 | do | 0 | | |
| 0.5 | | | H₂SO₄ | 20 | 700 | 1.5 | do | 0 | | |
| 0.4 | | | AlCl₃ | 12 | 700 | 2 | do | 0 | | |
| 0.5 | | 1 | HCl | −5 | 700 | 1.5 | do | 0 | | |
| 0.5 | | | AlCl₃ | 65 | 700 | 1 | Tar | 0 | | |
| 0.5 | 1.5 | 1.5 | H₂O | 10 | 700 | 1 | Starting material | 0 | | |

*Example 4.*—Isopropyl chloride (0.5 mole, 40 grams), HF (1.5 moles, 30 grams), and BF₃ (1.5 moles, 100 grams) were charged into a stainless steel tube at −60° C. Carbon monoxide was injected until the pressure reached 400 atmospheres and the mixture was agitated until the temperature reached +15° C. (ca. 1 hour). The resulting liquid containing isobutyryl fluoride was discharged into 200 milliliters of methanol. The resulting solution was neutralized with aqueous alkali to remove hydrogen fluoride produced by the esterification, etc., ice being added to cool the mixture. The sludge was filtered from the mixture and the filtrate was extracted with low-boiling petroleum ether. The extract was fractionally distilled and methyl isobutyrate was obtained, boiling largely at 87° to 91° C. (yield of methyl isobutyrate, 37 milliliters). A similar result is obtained using isopropyl bromide in place of isopropyl chloride.

It is to be understood that the foregoing examples are illustrative only and are not intended to limit the invention, since numerous methods of practicing the invention will occur to those who are skilled in the art. For example, the process of the invention can be operated either batchwise or continually. In the continuous process the boron trifluoride catalyst may be injected at one or more points along the reaction vessel as desired. Suitable inert diluents may be employed, but in general these are neither necessary nor desirable. Numerous organic halides containing secondary halogen (e. g. secondary alkyl chlorides, such as secondary butyl chloride, secondary amyl chloride, etc., polychlorohydrocarbons containing secondary chlorine, etc.) may be employed as organic halide reactants. Substances which form complexes with the anhydrous boron trifluoride may be present in the reaction mixture, but in general no substantial benefit results thereby. Auxiliary catalysts, such as aluminum chloride, mineral acids, etc., may be used, but only very minor advantages, if any, are gained in this manner.

Beta-chloroisobutyryl fluoride is highly useful as a reactant in numerous organic syntheses, and in particular, is especially valuable as an intermediate in the manufacture of methacrylic acid.

Since numerous embodiments of the invention can be made without departing from the spirit and scope thereof it is to be understood that we do not limit ourselves except as set forth in the following claims.

We claim:

1. A process for the synthesis of acyl fluorides which comprises reacting a secondary organic halide, containing a secondary halogen of the class consisting of chlorine and bromine, with carbon monoxide and hydrogen fluoride, in the presence of a boron trifluoride catalyst at a temperature within the range of −5° to +40° C. under a pressure in excess of 10 atmospheres.

2. The process of claim 1 in which the organic halide is isopropyl chloride.

3. The process of claim 1 in which the organic halide is isopropyl bromide.

4. The process of claim 1 in which the organic halide is 1,2-dichloropropane.

5. A process for the synthesis of beta-chloroisobutyryl fluoride which comprises reacting 1,2-dichloropropane with carbon monoxide and hydrogen fluoride simultaneously, in the presence of boron trifluoride, at a temperature within the range of —5° to +40° C. under a pressure in excess of 10 atmospheres, whereby beta-chloroisobutyryl fluoride is produced.

6. The process set forth in claim 5 in which the quantity of $BF_3$ catalyst is about one mole per mole of 1,2-dichloropropane charged.

7. The process set forth in claim 5, in which the reaction between 1,2-dichloropropane, carbon monoxide and hydrogen fluoride is conducted at a pressure of 65 to 700 atmospheres.

8. A process for the synthesis of beta-chloroisobutyryl fluoride which comprises reacting 1,2-dichloropropane with carbon monoxide and hydrogen fluoride simultaneously, in the presence of boron trifluoride, at a temperature of 0° to 20° C. under a pressure of 10 to 1,000 atmospheres, whereby beta-chloroisobutyryl fluoride is produced, and thereafter separating the said beta-chloroisobutyryl fluoride from the resulting mixture.

WILLIAM F. GRESHAM.
IRVING D. WEBB.

REFERENCES CITED

The following references are of record in the file of this patent:

UNITED STATES PATENTS

| Number | Name | Date |
|---|---|---|
| 2,053,233 | Woodhouse | Sept. 1, 1936 |
| 2,062,344 | Wiezevich et al. | Dec. 1, 1936 |
| 2,378,048 | Theobald | June 12, 1945 |
| 2,388,657 | Long | Nov. 6, 1945 |
| 2,411,982 | Theobald | Dec. 3, 1946 |

FOREIGN PATENTS

| Number | Country | Date |
|---|---|---|
| 547,101 | Great Britain | of 1942 |

OTHER REFERENCES

Anonymous, "Anhydrous Hydrogen Fluoride," The Chemical Trade Journal and Chemical Engineer, vol. 106, February 23, 1940, page 113.